United States Patent
Oidemizu et al.

(10) Patent No.: US 11,790,505 B2
(45) Date of Patent: Oct. 17, 2023

(54) INFORMATION PROCESSING APPARATUS, INFORMATION PROCESSING METHOD, AND INFORMATION PROCESSING SYSTEM

(71) Applicant: TOYOTA JIDOSHA KABUSHIKI KAISHA, Toyota (JP)

(72) Inventors: Takayuki Oidemizu, Nagakute (JP); Kazuyuki Inoue, Nagoya (JP); Ryosuke Kobayashi, Nagakute (JP); Yurika Tanaka, Yokosuka (JP); Tomokazu Maya, Nagoya (JP); Satoshi Komamine, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 203 days.

(21) Appl. No.: 17/347,928

(22) Filed: Jun. 15, 2021

(65) Prior Publication Data

US 2022/0005178 A1    Jan. 6, 2022

(30) Foreign Application Priority Data

Jul. 1, 2020   (JP) .................. 2020-114489

(51) Int. Cl.
*G06T 7/00*     (2017.01)
*G10L 25/66*    (2013.01)
*G01P 15/00*    (2006.01)
*G06T 7/60*     (2017.01)
*G06V 20/52*    (2022.01)
*G06V 40/10*    (2022.01)
*H04N 7/18*     (2006.01)

(52) U.S. Cl.
CPC ............ *G06T 7/0002* (2013.01); *G01P 15/00* (2013.01); *G06T 7/60* (2013.01); *G06T 7/97* (2017.01); *G06V 20/52* (2022.01); *G06V 40/10* (2022.01); *G10L 25/66* (2013.01); *G06T 2207/30196* (2013.01); *G06T 2207/30232* (2013.01); *H04N 7/18* (2013.01)

(58) Field of Classification Search
CPC .......... G06T 7/0002; G06T 7/60; G06T 7/97; G06T 2207/30196; G06T 2207/30232; G01P 15/00; G06V 20/52; G06V 40/10; G10L 25/66; H04N 7/18
USPC ........................................... 382/103
See application file for complete search history.

(56) References Cited

U.S. PATENT DOCUMENTS

| | | | | |
|---|---|---|---|---|
| 10,007,992 B1 * | 6/2018 | Harvey | ............... | G06T 7/62 |
| 10,949,929 B1 * | 3/2021 | Tofte | ............... | G06T 7/20 |
| 11,288,789 B1 * | 3/2022 | Chen | ............... | G06T 7/001 |

(Continued)

FOREIGN PATENT DOCUMENTS

| | | | | |
|---|---|---|---|---|
| CN | 109685937 A | * | 4/2019 | ......... G06K 9/00832 |
| GB | 2287152 A | * | 9/1995 | ........... G07C 5/0891 |

(Continued)

*Primary Examiner* — Matthew C Bella
*Assistant Examiner* — Pardis Sohraby
(74) *Attorney, Agent, or Firm* — Oliff PLC

(57) ABSTRACT

An information processing apparatus includes a controller configured to determine, upon detection of an impact applied to an object, whether the impact has caused damage to the object, and when it is determined that damage has been caused, identify a cause of the damage, based on a result of observation of a surrounding environment of the object at a time that the impact was applied.

14 Claims, 3 Drawing Sheets

(56) References Cited

U.S. PATENT DOCUMENTS

| | | | |
|---|---|---|---|
| 2014/0245210 A1* | 8/2014 | Battcher | G01S 13/95 715/771 |
| 2018/0189749 A1 | 7/2018 | Takamori et al. | |
| 2018/0189750 A1 | 7/2018 | Nonaka et al. | |
| 2018/0278801 A1* | 9/2018 | Ohno | G06V 20/52 |
| 2019/0043351 A1* | 2/2019 | Yang | G06F 18/24133 |
| 2019/0244498 A1* | 8/2019 | Dumas | G08B 13/19656 |
| 2021/0248681 A1* | 8/2021 | Zhang | G06V 20/10 |
| 2021/0287017 A1* | 9/2021 | Turk | G07C 5/0866 |

FOREIGN PATENT DOCUMENTS

| | | |
|---|---|---|
| JP | 2007-066323 A | 3/2007 |
| JP | 2008-027416 A | 2/2008 |
| WO | 2017/043276 A1 | 3/2017 |
| WO | 2017/051554 A1 | 3/2017 |

\* cited by examiner

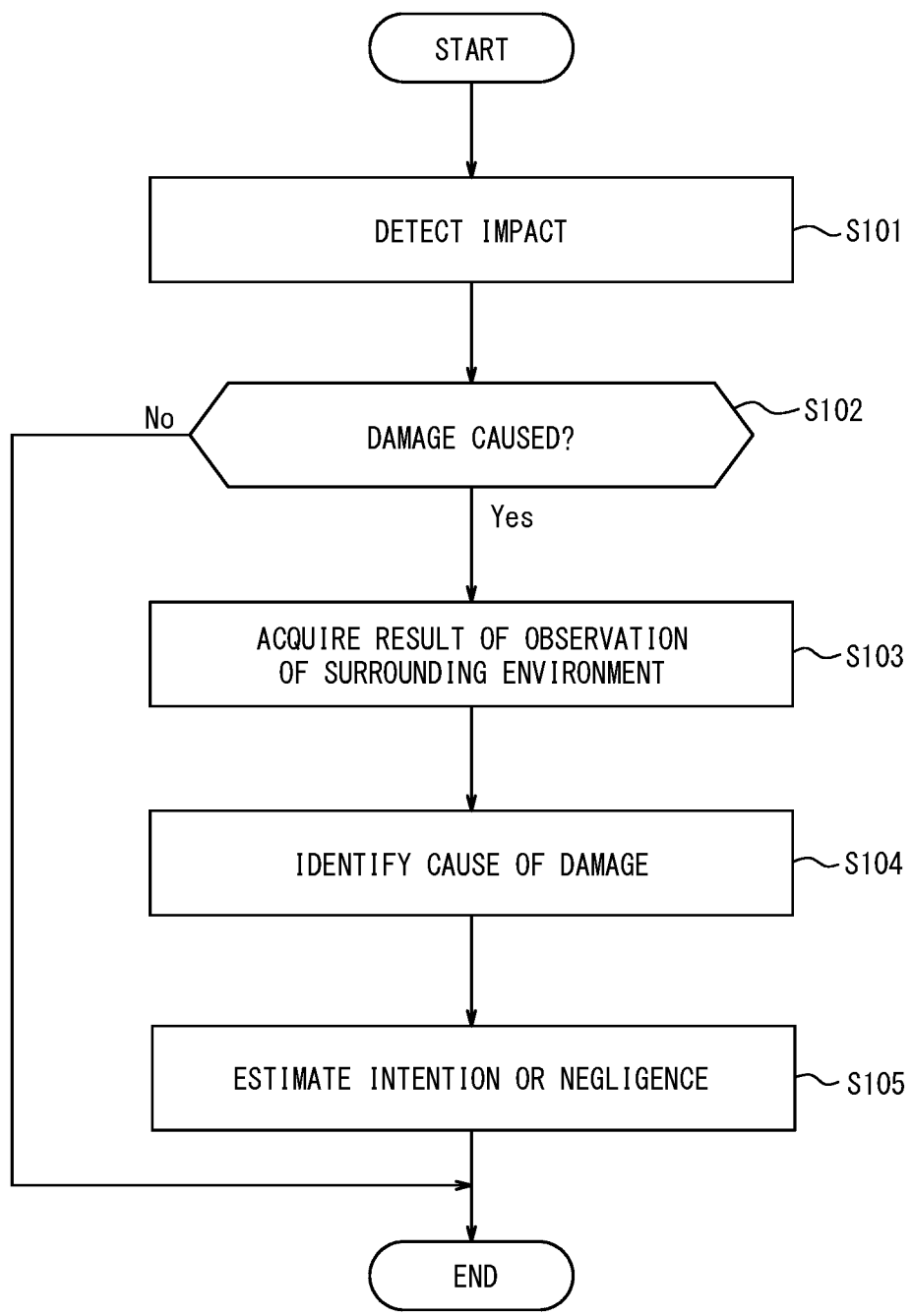

INFORMATION PROCESSING APPARATUS,
INFORMATION PROCESSING METHOD,
AND INFORMATION PROCESSING SYSTEM

CROSS-REFERENCE TO RELATED
APPLICATION

This application claims priority to Japanese Patent Application No. 2020-114489, filed on Jul. 1, 2020, the entire contents of which are incorporated herein by reference.

TECHNICAL FIELD

The present disclosure relates to an information processing apparatus, an information processing method, and an information processing system.

BACKGROUND

Patent Literature (PTL) 1 describes a technology for performing a structural integrity evaluation of an entire building by specifying critical positions and critical damage of the building and evaluating the critical damage at the critical position.

CITATION LIST

Patent Literature

PTL 1: WO 2017/043276 A

SUMMARY

According to the technology described in PTL 1, it is not possible to clarify where responsibility lies for the damage of the building.

It would be helpful to clarify where responsibility lies for damage caused to an object.

An information processing apparatus according to the present disclosure includes a controller configured to determine, upon detection of an impact applied to an object, whether the impact has caused damage to the object, and identify, when it is determined that damage has been caused, a cause of the damage based on a result of observation of a surrounding environment of the object at a time that the impact was applied.

An information processing method according to the present disclosure, includes:
  detecting, by a first sensor, an impact applied to an object;
  observing, by a second sensor, a surrounding environment of the object; and
  upon detection of the impact by the first sensor, determining, by an information processing apparatus, whether the impact has caused damage to the object, and when it is determined that damage has been caused, identifying a cause of the damage, based on a result of observing, by the second sensor, the surrounding environment of the object at a time that the impact was applied.

An information processing system according to the present disclosure, includes:
  a first sensor configured to detect an impact applied to an object;
  a second sensor configured to observe a surrounding environment of the object; and
  an information processing apparatus configured to determine, upon detection of the impact applied to an object by the first sensor, whether the impact has caused damage to the object, and when it is determined that damage has been caused, identify a cause of the damage, based on a result of observing, by the second sensor, the surrounding environment of the object at a time that the impact was applied.

The present disclosure enables to clarify where responsibility lies for damage caused to an object.

BRIEF DESCRIPTION OF THE DRAWINGS

In the accompanying drawings:
FIG. 3 is a diagram illustrating an operation of an information processing system according to an embodiment of the present disclosure.

DETAILED DESCRIPTION

Figure 1:
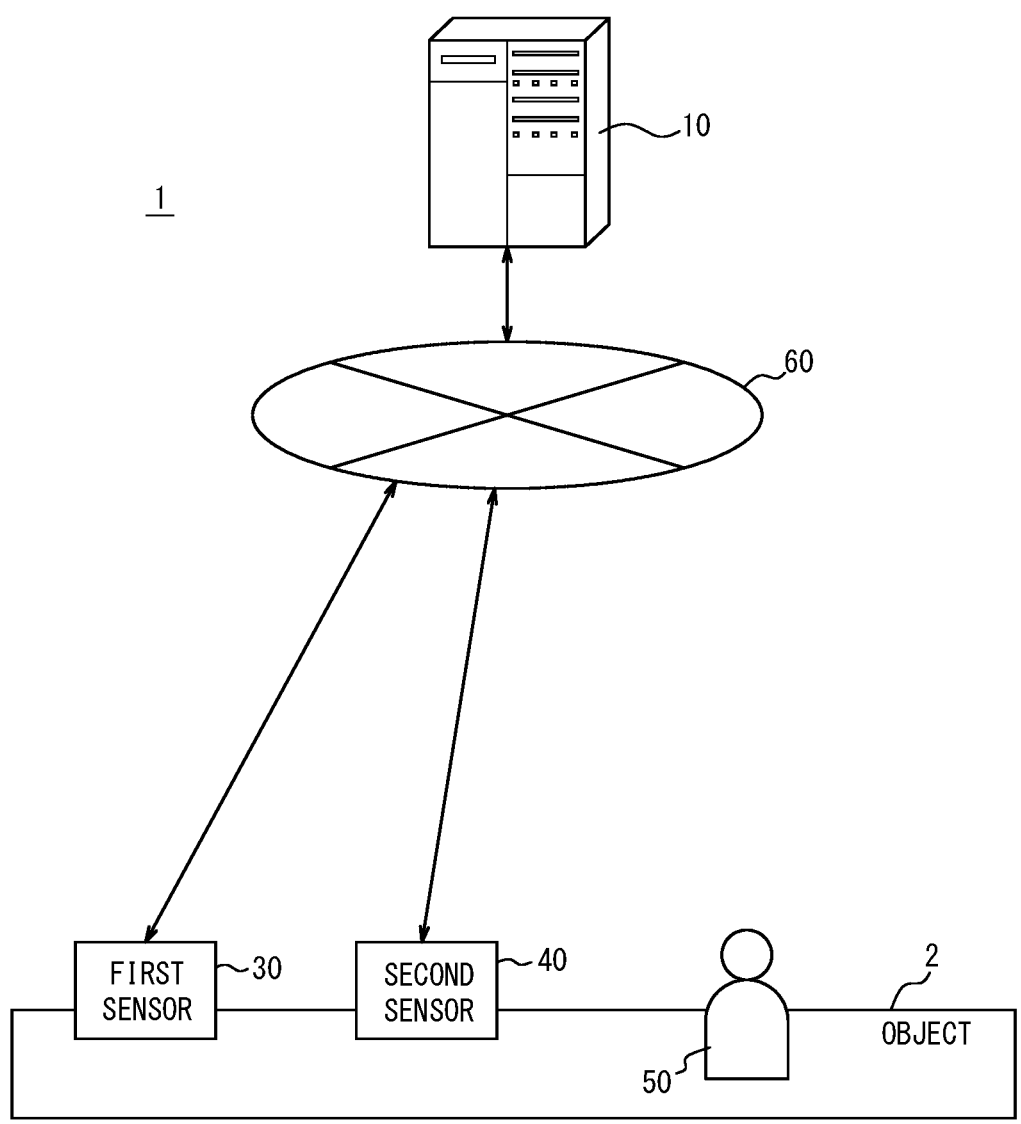
FIG. 1 is a diagram illustrating a configuration of an information processing system according to an embodiment of the present disclosure.

An embodiment of the present disclosure will be explained in below, with reference to the drawings.

In the drawings, the same or corresponding components are denoted herein by the same numerals. In the description of the present embodiment, descriptions of the same or corresponding components are simplified or omitted as appropriate.

A configuration of the information processing system 1 according to the present embodiment is explained with reference to FIG. 1.

The information processing system 1 according to the present embodiment includes a first sensor 30, a second sensor 40, and an information processing apparatus 10.

The information processing apparatus 10 is capable of communicating with the first sensor 30 and the second sensor 40 via a network 60.

Examples of the network 60 include the Internet, at least one WAN, at least one MAN, and a combination thereof. "WAN" is an abbreviation of wide area network. "MAN" is an abbreviation of metropolitan area network. The network 60 may include at least one wireless network, at least one optical network, or a combination thereof. Examples of the wireless network include an ad hoc network, a cellular network, a wireless LAN, a satellite communication network, and a terrestrial microwave network. "LAN" is an abbreviation of local area network.

The information processing apparatus 10 is installed in a facility such as a data center. The information processing apparatus 10 is, for example, a server which belongs to a cloud computing system or other computing systems.

The first sensor 30 is installed on the object 2 and detects an impact applied to the object 2. In the present embodiment, the first sensor 30 is a vibration sensor or an acceleration sensor.

The second sensor 40 is installed on the object 2. In the present embodiment, the second sensor 40 is configured as, for example, a camera such as a network camera or an IP camera. "IP" is an abbreviation for internet protocol. Instead of being installed on the object 2, the second sensor 40 may be configured as, for example, a drone equipped with a camera that is capable of capturing, from air, an image of the object 2 and its surrounding environment.

The image captured by the second sensor 40 is a moving image in the present embodiment, but may be a still image.

In the present embodiment, the second sensor 40 is configured as a surveillance camera.

The second sensor 40 may further include a sound input function, and may collect sound generated in the object 2 in addition to the captured image or instead of the captured image. The sound input function is realized, for example, as a recorder such as a microphone. With the sound input function provided to the second sensor 40, sound generated in the object 2 and its surroundings can be acquired at a time that an impact is applied to the object 2. As a modification of the present embodiment, the information processing system 1 may include a sensor having a sound input function, separately from the second sensor 40.

The object 2 is a member constituting an arbitrary building to be used by an unspecified person. Examples of the building include communal facilities such as schools, libraries, or community halls, accommodation facilities such as hotels or inns, and apartment buildings. In the present embodiment, the object 2 is a wall, a floor, a window, or a door in a common area of an apartment house.

In the present embodiment, cases in which an impact is applied to the object 2 include, for example, cases in which a natural disaster such as an earthquake occurs, or cases in which an object collides or falls on the object 2. In the present embodiment, it is supposed that an impact is applied to the object 2 by the individual 50 illustrated in FIG. 1, and damage is caused to the object 2 by the impact. Damage to be caused to the object 2 may include deformation, defect, cracking, subsidence, or peel of a member as the object 2.

An outline of the present embodiment will be described with reference to FIG. 1.

In the information processing system 1 according to the present embodiment, the first sensor 30 detects an impact applied to the object 2. Upon detection of the impact by the first sensor 30, the second sensor 40 observes the surrounding environment of the object 2. The information processing apparatus 10 determines whether the detected impact has caused damage to the object 2. When it is determined that damage has been caused, the information processing apparatus 10 identifies the cause of the damage, based on the result of observing, by the second sensor 40, the surrounding environment of the object 2 at a time that the impact was applied to the object 2.

The present embodiment enables to clarify where the responsibility lies for the damage by observing the surrounding environment of the object 2 at the time that an impact was applied to the object 2.

In the information processing system 1 according to the present embodiment, the observing of the surrounding environment of the object 2 by the second sensor 40 includes capturing an image of the surrounding environment by the second sensor 40.

The present embodiment enables to clarify where the responsibility lies for the damage, based on the image of the surrounding environment captured by the second sensor 40 at the time that the impact was applied to the object 2.

In the information processing system 1 according to the present embodiment, the observing of the surrounding environment of the object 2 includes recording, by the second sensor 40, the sound of the surrounding environment at the time that the impact was applied.

The present embodiment enables to clarify where the responsibility lies for the damage, based on the sound of the surrounding environment recorded by the second sensor 40 at the time that the impact was applied to the object 2.

In the information processing system 1 according to the present embodiment, the determining of whether the impact has caused damage to the object 2 includes comparing a first local image and a second local image by the information processing apparatus 10, to thereby determine whether damage has been caused to the object 2. The first local image is an image of a site of the object 2 to which the impact will be later applied, acquired before detection of the impact. The second local image is an image of a site of the object 2 to which the impact was applied, acquired after detection of the impact.

The present embodiment enables to make a targeted comparison between the images of the site in the object 2 where the impact occurred, to thereby accurately detect whether damage has been caused by the impact.

Figure 2:
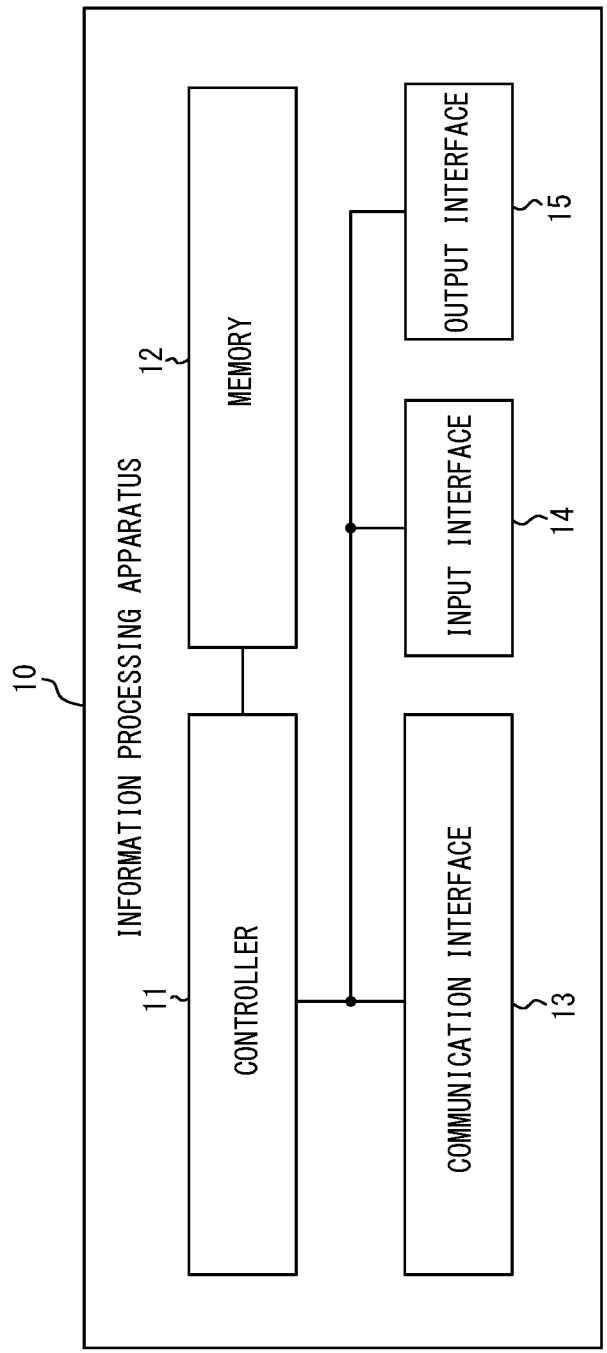
FIG. 2 is a block diagram illustrating a configuration of an information processing apparatus according to an embodiment of the present disclosure.

Referring to FIG. 2, a configuration of the information processing apparatus 10 according to the present embodiment will be described.

The information processing apparatus 10 includes a controller 11, a memory 12, a communication interface 13, an input interface 14, and an output interface 15.

The controller 11 includes at least one processor, at least one dedicated circuit, or a combination thereof. The processor is a general purpose processor such as a CPU or a GPU, or a dedicated processor that is dedicated to specific processing. "CPU" is an abbreviation of central processing unit. "GPU" is an abbreviation of graphics processing unit. Examples of the dedicated circuit include an FPGA and an ASIC. "FPGA" is an abbreviation of field-programmable gate array. "ASIC" is an abbreviation of application specific integrated circuit. The controller 11 executes processes related to the operation of the information processing apparatus 10 while controlling each component of the information processing apparatus 10.

The memory 12 includes at least one semiconductor memory, at least one magnetic memory, at least one optical memory, or a combination of at least two of these. Examples of the semiconductor memory include RAM and ROM. "RAM" is an abbreviation of random access memory. "ROM" is an abbreviation of read only memory. Examples of RAM include SRAM and DRAM. "SRAM" is an abbreviation of static random access memory. "DRAM" is an abbreviation of dynamic random access memory. An example of ROM includes EEPROM. "EEPROM" is an abbreviation of electrically erasable programmable read only memory. The memory 12 functions as, for example, a main memory, an auxiliary memory, or a cache memory. The memory 12 stores data for use in operations of the information processing apparatus 10 and data acquired by operations of the information processing apparatus 10.

The communication interface 13 includes at least one interface for communication. An example of the interface for communication includes a LAN interface. The communication interface 13 receives data for use in operations of the information processing apparatus 10, or transmits data acquired by operations of the information processing apparatus 10.

The input interface 14 includes at least one interface for input. Examples of the interface for input include a physical key, a capacitive key, a pointing device, a touch screen integrally provided with a display, and a microphone. The input interface 14 receives an operation for inputting data for use in operations of the information processing apparatus 10. The input interface 14 may be connected to the information processing apparatus 10 as an external input device, instead of being provided to the information processing apparatus 10. The connection may be established through any appropriate communication method such as USB, HDMI® (HDMI is a registered trademark in Japan, other countries, or both), or Bluetooth® (Bluetooth is a registered trademark in Japan, other countries, or both). "USB" is an abbreviation of Universal Serial Bus. "HDMI®" is an abbreviation of High-Definition Multimedia Interface.

The output interface 15 includes at least one interface for output. Examples of the interface for output include a display and a speaker. Examples of the display include an LCD and an organic EL display. "LCD" is an abbreviation of liquid crystal display. "EL" is an abbreviation of electro luminescence. The output interface 15 outputs data acquired by the operations of the information processing apparatus 10. The output interface 15 may be connected to the information processing apparatus 10 as an external output device, instead of being provided to the information processing apparatus 10. The connection may be established through any communication method such as USB, HDMI®, or Bluetooth®.

The functions of the information processing apparatus 10 are realized by execution of an information processing program according to the present embodiment, by a processor corresponding to the controller 11. That is, the functions of the information processing apparatus 10 are realized by software. The information processing program causes a computer to execute the operations of the information processing apparatus 10, to thereby cause the computer to function as the information processing apparatus 10. In other words, the computer executes the operations of the information processing apparatus 10 in accordance with the information processing program, to thereby function as the information processing apparatus 10.

The program may be stored on a non-transitory computer readable medium. Examples of the non-transitory computer readable media include a flash memory, a magnetic recording device, an optical disk, a magneto-optical storage device, and ROM. The program is distributed, for example, by selling, transferring, or lending a portable recording medium such as an SD-card, a DVD, or a CD-ROM in which the program is stored. "SD" is an abbreviation for Secure Digital. "DVD" is an abbreviation of digital versatile disc. "CD-ROM" is an abbreviation of compact disc read only memory. The program may be stored in storage in a server and distributed by transferring the program from the server to another computer. The program may be provided as a program product.

For example, the computer temporarily stores, in a main memory, a program stored in a portable medium or a program transferred from a server. The computer then reads out, using a processor, the program stored in the main memory, and executes processing by the processor, in accordance with the read program. The computer may read out a program directly from the portable medium, and execute processing according to the program. Each time a program is transferred from the server to the computer, the computer may sequentially execute processing in accordance with the received program. The processing may be executed through a so-called ASP type service which realizes functions merely by execution of instructions and acquisition of results, without transferring the program from the server to the computer. "ASP" is an abbreviation of application service provider. The program includes information for use in processing by an electronic computer, equivalent to a program. For example, data that is not a direct instruction to a computer but has properties that define the processing of the computer is "information equivalent to a program".

Some or all of the functions of the information processing apparatus 10 may be realized by a dedicated circuit corresponding to the controller 11. That is, some or all of the functions of the information processing apparatus 10 may be realized by hardware.

An operation of the information processing system 1 according to the present embodiment will be described with reference to FIG. 3. The operation corresponds to an information processing method according to the present embodiment.

As one example, it is supposed that damage to the object 2 was caused by the individual 50 falling over. Further, it is supposed that the individual 50 has lost consciousness due to the fall.

When the individual 50 falls over, an impact is applied to the object 2. In Step S101, the impact is detected by the first sensor 30. The first sensor 30 transmits, to the information processing apparatus 10, information that indicates detection of the impact. The controller 11 of the information processing apparatus 10 receives the information transmitted from the first sensor 30, via the communication interface 13. That is, the controller 11 acquires the information that indicates detection of the impact applied to the object 2. The information may include the position information for the site where the impact was applied. Upon detection of the impact applied to the object 2, the controller 11 of the information processing apparatus 10 determines, in Step S102, whether the impact has caused damage to the object 2.

The determination of whether the impact has caused damage to the object 2 may be performed by any appropriate method; in the present embodiment, the determination is performed by the following method.

The controller 11 of the information processing apparatus 10 determines whether any damage has been caused to the object 2 by comparing a first local image and a second local image. The first local image is an image acquired by capturing, before the impact is detected, the site of the object 2 where the impact will be later applied. The second local image is an image acquired by capturing, after the impact was detected, the site of the object where the impact was applied. Specifically, the controller 11 first identifies the site at which the impact was applied to the object 2. The controller 11 obtains, as the first local image, an image of the site captured by the second sensor 40 before the impact was applied. The controller 11 obtains, as the second local image, an image of the site captured by the second sensor 40 after the impact was applied. When the damage found in the second local image is not found in the first local image, the controller 11 determines that the damage was caused by the impact. The controller 11 may use, as the first local image, an image obtained by enlarging the site to which the impact will be later applied, in the image captured by the second sensor 40 before the impact is applied. The controller 11 may use, as the second local image, an image obtained by enlarging the site to which the impact was applied, in the image captured by the second sensor 40 after the impact was applied.

When it is determined in Step S102 that damage was caused to the object 2, the controller 11 of the information processing apparatus 10 acquires, in Step S103, a result of observation of the surrounding environment of the object 2 at a time that the impact was applied. In the present embodiment, the controller 11 of the information processing apparatus 10 acquires a surrounding image as the result of observation of the surrounding environment. The surrounding image is an image of the surrounding environment captured by the second sensor 40 at the time that the impact was applied. Specifically, the controller 11 receives, via the communication interface 13, the image captured by the second sensor 40 at the time that the impact was applied. When it is determined in Step S102 that no damage has been caused, the flow of FIG. 3 ends.

In Step S104, the controller 11 of the information processing apparatus 10 identifies a cause of the damage. In the present embodiment, the controller 11 identifies the cause, based on the result of observation of the surrounding environment acquired in Step S103. Specifically, the controller 11 analyzes an image captured by the second sensor 40 and identifies the individual 50 in the image.

In the present embodiment, the individual 50 is in the image captured by the second sensor 40, and the controller 11 identifies the individual 50 as the cause of the damage. The individual 50 may be identified by any appropriate method; in the present embodiment, the controller 11 identifies the individual 50 through facial recognition with reference to, for example, a database in which one or more individuals who may use a facility as the object 2 are stored in advance.

As a modification of the present embodiment, the controller 11 of the information processing apparatus 10 may acquire, as the result of observation of the surrounding environment of the object 2, a surrounding sound recorded in the surrounding environment at the time that the impact was applied, in addition to or instead of the image captured by the second sensor 40. The controller 11 may identify the individual who made the surrounding sound as the cause of the damage.

Specifically, in Step S104, the controller 11 of the information processing apparatus 10 may analyze a sound generated at the object 2 at the time that the impact was applied, to thereby identify the individual 50. The sound has been acquired by the second sensor 40 using the sound input function, as the result of observation of the surrounding environment acquired in Step S103.

In the present modification, the sound acquired by the sound input function of the second sensor 40 includes the voice of the individual 50, and the controller 11 identifies the individual 50 as the cause of the damage. The identification of the individual 50 may be performed by any appropriate method; in the present modification, the controller 11 analyzes the voiceprint of the voice, refers to, for example, a database in which one or more individuals who may use a facility as the object 2 are stored in advance, and extracts an individual whose voiceprint matches to that of the individual 50, to thereby identify the individual 50.

In this manner, the controller 11 of the information processing apparatus 10 identifies the cause of the damage based on the result of observation of the surrounding environment of the object 2 at the time that the impact was applied.

The controller 11 of the information processing apparatus 10 may further output the result of identifying the cause of the damage, as information that indicates where the responsibility lies for the damage. Specifically, as the result of identifying the cause of the damage, the controller 11 may generate and output personal information that indicates, for example, at least one of the name and the address of the individual 50 as the information that indicates where the responsibility lies for the damage. The controller 11 may transmit, via the communication interface 13, the output information to an organization or a person, such as a management association of an apartment building, who is to bear the cost for repairing the damage. The present modification enables to clarify where the responsibility lies for the damage, so as to properly determine who bears the cost for repairing the damage.

In Step S105, the controller 11 of the information processing apparatus 10 further estimates whether the identified individual 50 caused the damage by intention or negligence. In the present embodiment, the controller 11 of the information processing apparatus 10 determines whether the individual 50 is conscious, and estimates that neither intention nor negligence is involved when the individual 50 is unconscious. The determination of whether the individual 50 is conscious may be performed by any appropriate method; in the present embodiment, the determination is performed by the following method.

The controller 11 of the information processing apparatus 10 determines whether the individual 50 is conscious, based on at least one of the surrounding image and the image of the surrounding environment captured after the impact was applied, and estimates that neither intention nor negligence was involved in a case in which the individual 50 is unconscious. In the present embodiment, the controller 11 determines whether the individual 50 is conscious, based on at least one of the surrounding image and the image of the surrounding environment captured by the second sensor 40 after the impact was applied, the images having been acquired in Step S103. Specifically, the controller 11 analyzes at least one of an image of the surrounding environment captured by the second sensor 40 at the time that an impact was applied and an image of the surrounding environment captured by the second sensor 40 after the impact was applied, and determines whether the individual 50 in the image is conscious.

In this example, the controller 11 compares the location of the individual 50 who is in the image of the surrounding environment captured by the second sensor 40 at the time that the impact was applied, with the location of the individual 50 who is in the image of the surrounding environment captured by the second sensor 40 after the impact was applied. When it is determined that the locations are the same, the controller 11 determines that the individual 50 is unconscious because the individual 50 has not moved from where the individual 50 fell over.

As a modification of the present embodiment, the controller 11 of the information processing apparatus 10 may determine whether the individual 50 is conscious, based on at least one of the surrounding sound and the sound of the surrounding environment recorded after the impact was applied. Specifically, the controller 11 analyzes at least one of the sound of the surrounding environment recorded by the second sensor 40 at the time that an impact was applied and the sound of the surrounding environment recorded by the second sensor 40 after the impact was applied, to thereby determine whether the individual 50 is conscious.

In the present modification, the voice of the individual 50 is not detected from the sound recorded after the impact was applied, among the sound recorded by the second sensor 40. Thus, the controller 11 determines that the individual 50 is unconscious. The voice of the individual 50 may be detected by any appropriate method; in the present modification, the controller 11 detects the voice of the individual 50 by analyzing the sound recorded by the second sensor 40 after the impact was applied and extracting the voice that coincides with, for example, the voice print of the individual 50.

As a modification of the present embodiment, the controller 11 of the information processing apparatus 10 may determine whether the individual 50 is conscious, based on biometric information of the individual 50 acquired after the impact was applied. Specifically, after the impact was applied, the controller 11 acquires biometric information indicating the heart rate, the pulse rate, the respiration rate, or the blood pressure measured by a biosensor attached to the individual 50, and analyzes the biometric information, to thereby determine whether the individual 50 is conscious.

As a modification of the present embodiment, the controller 11 of the information processing apparatus 10 may evaluate the level of consciousness of the individual 50 in a stepwise manner and estimate the degree of intention or negligence in a stepwise manner in accordance with the level of consciousness, along with or instead of determining whether the individual 50 is conscious. Specifically, the controller 11 may estimate that the degree of intention or negligence is low when the level of consciousness of the individual 50 is equal to or lower than a threshold.

The controller 11 of the information processing apparatus 10 may further output the result of estimating intention or negligence as information that indicates whether the individual 50 is responsible for the damage. Specifically, the controller 11 may generate and output, as the result of estimating intention or negligence, information that indicates whether the individual 50 is conscious or unconscious, or information that indicates the heart rate, the pulse rate, the respiration rate, or the blood pressure of the individual 50, as the information that indicates whether the individual 50 is responsible for the damage. The controller 11 may transmit, via the communication interface 13, the output information to an organization or a person, such as a management association of an apartment building, who is to bear the cost for repairing the damage. The present modification enables to readily determine that an individual who caused the damage would be exempted from the liability unless the damage was caused by intention or negligence, and also to properly determine the proportion of the burden of the repair costs.

As described above, upon detection of an impact applied to the object 2, the controller 11 of the information processing apparatus 10 determines whether the impact has caused any damage to the object 2. When it is determined that damage has been caused, the controller 11 identifies the cause of the damage based on the result of observation of the surrounding environment of the object 2 at the time that the impact was applied. According to the present embodiment, where the responsibility lies for the damage caused to the object 2 becomes clear.

As a modification of the present embodiment, when it is determined in Step S102 that damage was caused, the controller 11 of the information processing apparatus 10 may further evaluate the degree of the damage based on the second local image. The degree of the damage may be evaluated in any appropriate method. For example, the controller 11 evaluates the degree of the damage by measuring the dimension of the damage in the second local image. Specifically, the controller 11 measures the depth and area of the damage found in the second local image, and evaluates that the degree of the damage is greater when the dimension measured for the damage is equal to or greater than a threshold value.

The controller 11 may calculate the cost to be needed for repairing the damage, based on the second local image, to thereby evaluate the degree of the damage. Specifically, the controller 11 estimates components, personnel, repair processes, and the number of days or the like to be needed for repairing the damage, based on the image of the damage in the second local image, calculates the cost of the repair, and evaluates the degree of the damage to be greater when the calculated amount of the cost is equal to or larger than a threshold.

The controller 11 may identify a material to be needed for repairing the damage, based on the second local image, to thereby evaluate the degree of the damage. Specifically, the controller 11 identifies the damaged site from the second local image, refers to, for example, a database in which the material of each portion of the object 2 is stored in advance, identifies the material of the identified site, and evaluates the degree of the damage to be greater when the cost of the material that matches the identified material is equal to or higher than a threshold.

As a modification of the present embodiment, the controller 11 of the information processing apparatus 10 may further output the result of evaluating the degree of the damage as information relating to repair of the damage. Specifically, as a result of evaluating the degree of the damage, the controller 11 may generate and output information that indicates, for example, the dimension of the damage, the cost to be needed for repairing the damage, or the material to be needed for repairing the damage, as the information relating to the repair of the damage. The controller 11 may transmit the output information to a department or a person in charge of repairs, such as, for example, an administrator of an apartment building, via the communication interface 13. The present modification enables to quickly notify the information relating to the repair to a person in charge, to thereby shorten the time required for the repair.

The present disclosure is not limited to the embodiments described above. For example, a plurality of blocks described in the block diagrams may be integrated, or a block may be divided. Instead of executing a plurality of steps described in the flowcharts in chronological order in accordance with the description, the plurality of steps may be executed in parallel or in a different order according to the processing capability of the apparatus that executes each step, or as required. Other modifications can be made without departing from the spirit of the present disclosure.

For example, the information processing apparatus 10 may be mounted or installed on the object 2. In such case, at least part of the operation of the first sensor 30 or the second sensor 40 may be performed by the information processing apparatus 10. The first sensor 30 may be integrated into the second sensor 40.

The invention claimed is:

1. An information processing apparatus comprising a controller including at least one processor, at least one dedicated circuit, or a combination thereof, the controller being configured to determine, upon detection of an impact applied to an object, whether the impact has caused damage to the object, and identify, when it is determined that damage has been caused, a cause of the damage based on a result of observation of a surrounding environment of the object at a time that the impact was applied, wherein the controller is configured to acquire, as the result of observation of the surrounding environment, a surrounding image that is an image of the surrounding environment captured at the time that the impact was applied, the controller is configured to identify, as the cause of the damage, an individual in the surrounding image, and the controller is configured to further estimate whether the identified individual caused the damage by intention or negligence based on biometric information of the identified individual.

2. The information processing apparatus according to claim 1, wherein the controller is configured to determine, based on at least any of the surrounding image and an image of the surrounding environment captured after the impact was applied, whether the individual is conscious, and in a case in which the individual is unconscious, estimate that the individual did not cause the damage by intention or negligence.

3. The information processing apparatus according to claim 1, wherein the controller is configured to, upon detection of the impact, determine whether damage was caused to the object by comparing a first local image and a second local image, the first local image being an image acquired by capturing, before the impact is detected, a site of the object where the impact will be later applied, the second local image being an image acquired by capturing, after the impact was detected, a site of the object where the impact was applied.

4. The information processing apparatus according to claim 3, wherein the controller is configured to, when damage that is not found in the first local image is in the second local image, determine that damage was caused, and evaluate a degree of the damage based on the second local image.

5. The information processing apparatus according to claim 4, wherein the controller is configured to evaluate the degree of the damage by measuring a dimension of the damage based on the second local image.

6. The information processing apparatus according to claim 4, wherein the controller is configured to evaluate the degree of the damage by calculating a cost to be needed for repairing the damage, based on the second local image.

7. The information processing apparatus according to claim 4, wherein the controller is configured to evaluate the degree of the damage by identifying a material to be needed for repairing the damage, based on the second local image.

8. The information processing apparatus according to claim 4, wherein the controller is configured to output a result of evaluating the degree of the damage as information relating to repair of the damage.

9. An information processing system comprising:
the information processing apparatus according to claim 1;
a first sensor configured to detect the impact applied to the object; and
a second sensor configured to observe the surrounding environment of the object.

10. The information processing apparatus according to claim 1, wherein the biometric information includes at least one of heart rate, pulse rate, respiration rate, and blood pressure measured by a sensor attached to the identified individual.

11. An information processing apparatus comprising a controller including at least one processor, at least one dedicated circuit, or a combination thereof, the controller being configured to determine, upon detection of an impact applied to an object, whether the impact has caused damage to the object, and identify, when it is determined that damage has been caused, a cause of the damage based on a result of observation of a surrounding environment of the object at a time that the impact was applied,
wherein the controller is configured to acquire, as the result of the observation of the surrounding environment, a surrounding sound that is a sound recorded in the surrounding environment at the time that the impact was applied,
the controller is configured to identify, as the cause of the damage, an individual who made the surrounding sound, and
the controller is configured to further estimate whether the identified individual caused the damage by intention or negligence based on biometric information of the identified individual.

12. The information processing apparatus according to claim 11, wherein the controller is configured to determine whether the individual is conscious, based on at least any of the surrounding sound and a sound in the surrounding environment recorded after the impact was applied, and when the individual is unconscious, estimate that the individual caused the damage not by intention or negligence.

13. An information processing system comprising:
the information processing apparatus according to claim 11;
a first sensor configured to detect the impact applied to the object; and
a second sensor configured to observe the surrounding environment of the object.

14. The information processing apparatus according to claim 11, wherein the biometric information includes at least one of heart rate, pulse rate, respiration rate, and blood pressure measured by a sensor attached to the identified individual.

* * * * *